United States Patent [19]
Tano

[11] Patent Number: 6,067,488
[45] Date of Patent: May 23, 2000

[54] VEHICLE DRIVING RECORDER, VEHICLE TRAVEL ANALYZER AND STORAGE MEDIUM

[75] Inventor: Michiyasu Tano, Yokohama, Japan

[73] Assignee: Data Tec Co., Ltd., Japan

[21] Appl. No.: 08/756,895

[22] Filed: Dec. 2, 1996

[30] Foreign Application Priority Data

Aug. 19, 1996 [JP] Japan ..................... 8-217252

[51] Int. Cl.$^7$ .......... B60R 27/00; G01C 21/00; G06F 15/74
[52] U.S. Cl. ............................ 701/35
[58] Field of Search .............. 701/1, 9, 25, 33, 701/35, 39, 110; 73/117.3, 118.1

[56] References Cited

U.S. PATENT DOCUMENTS

| | | | |
|---|---|---|---|
| 3,582,632 | 6/1971 | Foster ............................. | 701/1 |
| 4,939,652 | 7/1990 | Steiner ........................... | 701/35 |
| 5,173,856 | 12/1992 | Purnell et al. ................. | 701/35 |
| 5,249,127 | 9/1993 | Komatsu ........................ | 701/35 |
| 5,446,659 | 8/1995 | Yamawaki ..................... | 701/35 |
| 5,499,182 | 3/1996 | Ousborne ...................... | 701/35 |
| 5,608,629 | 3/1997 | Cuddihy et al. .............. | 701/1 |
| 5,815,070 | 9/1998 | Yoshikawa ................... | 340/439 |

OTHER PUBLICATIONS

Japanese Patent Abstract for Japanese Patent Appln. JP–A–5–87585, Publication No. 05087585, published Apr. 6, 1993.

Japanese Patent Abstract for Japanese Patent Appln. JP–A–7–182548, Publication No. 07182548, published Jul. 21, 1995.

Japanese Patent Abstract for Japanese Patent Appln. JP–A–6–38157, Publication No. 06038157, published Feb. 10, 1994.

*Primary Examiner*—George Dombroske
*Attorney, Agent, or Firm*—Bachman & LaPointe, P.C.

[57] ABSTRACT

In a driving recorder, angular velocity data and acceleration data of a vehicle are sequentially measured and stored into a memory along with time information, thereby updating the data stored in the memory in sequence. If a shock due to crash or the like occurs at the vehicle, a given time period is set for further data storage. When the time is up, the data storage into the memory is stopped. Thus, the memory holds at least the angular velocity data and the acceleration data for the set time period after detection of the occurrence of shock and for a given time period before detection of the occurrence of shock. Upon analysis, a travel analyzer is connected to the driving recorder for reading out the data stored in the memory. Based on the read-out data, the travel analyzer produces data representing a travel history of the vehicle and visually expresses such travel history data.

16 Claims, 11 Drawing Sheets

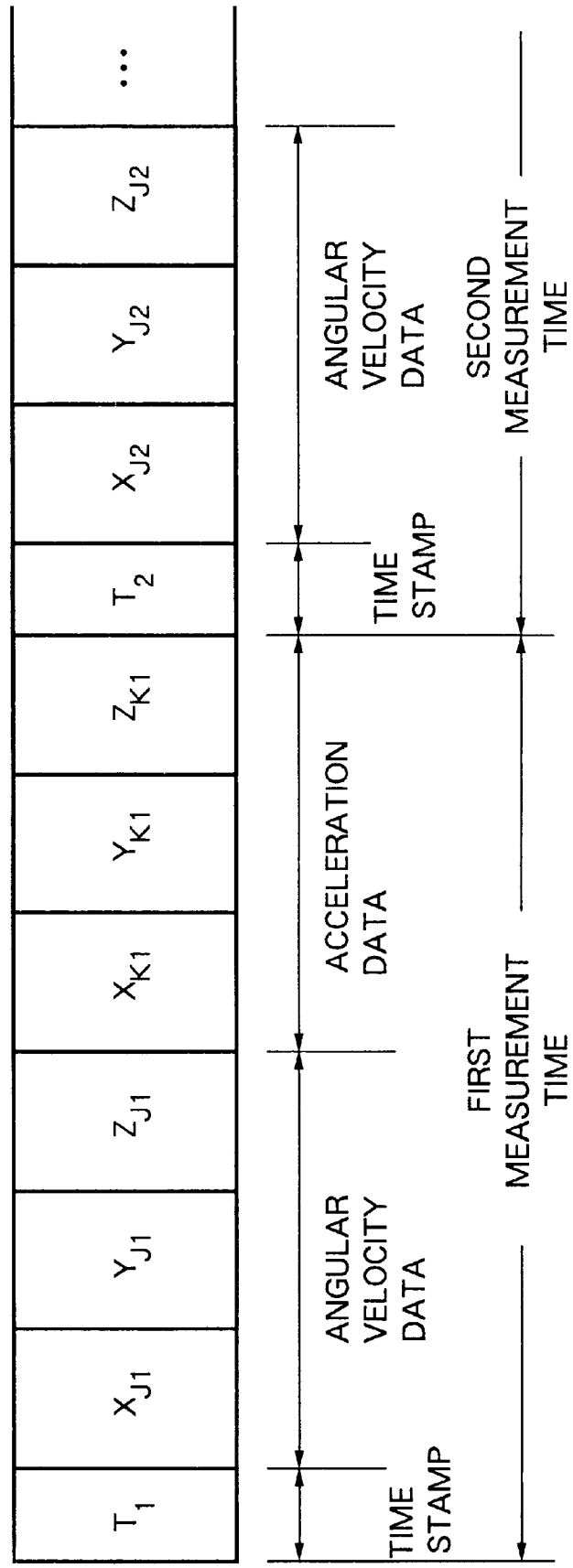
F I G . 4

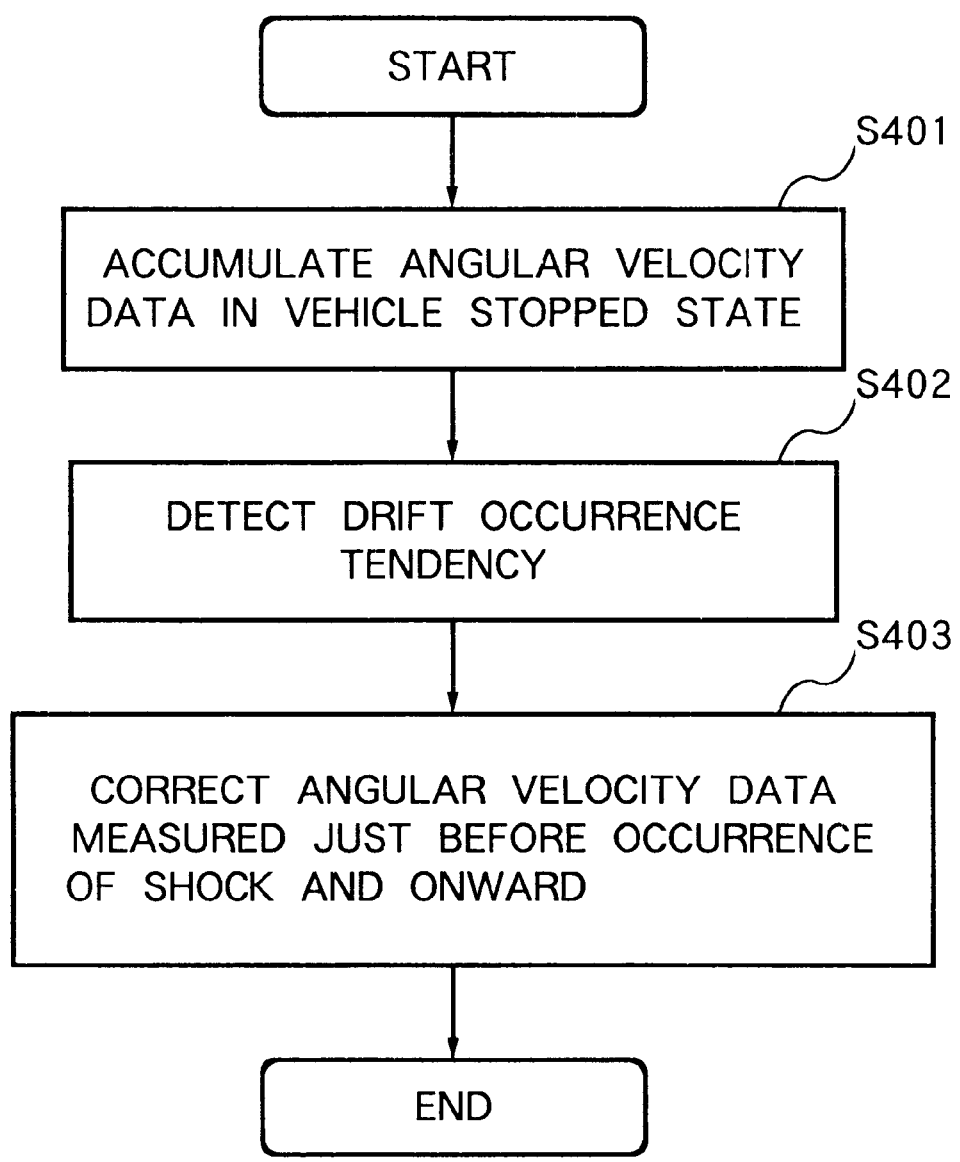

| ACCELERATION DATA | 0.2° | 1.2° | 0.5° | 2.0° |
|---|---|---|---|---|
| ANGULAR VELOCITY DATA | 0.2° | 1.4° | 0.9° | 2.6° |
| DIFFERENCE | 0° | 0.2° | 0.4° | 0.6° |

VEHICLE DRIVING RECORDER, VEHICLE TRAVEL ANALYZER AND STORAGE MEDIUM

BACKGROUND OF THE INVENTION

1. Field of the Invention

The present invention relates to a technique for analyzing, ex post facto, historical travel data representing travel attitude angles and velocities of a vehicle changing in time sequence, particularly, historical travel data around (before and after) an occurrence of an accident such as a collision or a crash, so as to achieve scientific elucidation of a cause of the accident.

2. Description of the Prior Art

Recently, many vehicles have been equipped with safety devices which are automatically operated so as to avoid danger upon detection of abnormality during traveling. However, to whatever extent the safety of the vehicle may be mechanically improved, driver's awareness or appreciation about the safety is essential for reducing the accidents on a substantial basis. For example, the driver runs the vehicle relying on his or her own sensibility or judgment, which, however, changes depending on an environmental situation. As appreciated, even while running the vehicle at the same speed, for example, at 100 km/h, the driver senses it differently depending on whether traveling on an express highway or a general road. Thus, for ensuring the driving safety, it is necessary for the driver to recognize such ambiguousness of his or her own sensibility.

On the other hand, the recent development of the vehicular safety devices tends to make it difficult to fully catch an actual state of the accident only from ex-post conditions upon inspection, thus leading to difficulty in achieving an objective judgment or elucidation of a cause of the accident. As a result, it is possible that an unfounded and unreasonable result of the inspection is given to a victim or an assaulter of the accident. Further, there has been available no way of scientific analysis for providing an effective accident preventive measure.

SUMMARY OF THE INVENTION

Therefore, it is an object of the present invention to provide an improved technique capable of giving a chance to a driver for enhancing his or her consciousness on safety driving, holding travel data of a vehicle which get to be a basis for an objective judgment or elucidation of a cause of an occurrence of an accident, and analyzing such travel data of the vehicle.

According to one aspect of the present invention, a vehicle driving recorder comprises a sensor section for, in time sequence, measuring travel attitudes and accelerations of a vehicle relative to axes of a plurality of dimensions and outputting them as measured data; a memory for storing the measured data outputted from the sensor section; and memory control means for controlling storage and reading of the measured data into and from the memory, wherein the memory control means comprises a measured data storage processing section for sequentially storing the measured data into the memory to update the stored measured data in the memory; and a measured data output section for, upon detection of a command sent from an external device, transferring the measured data stored in the memory to the external device.

It may be arranged that the memory control means further comprises a shock detecting section for analyzing the measured data to detect presence or absence of an occurrence of shock; and a storage regulating section for, upon detection of the occurrence of shock by the shock detecting section, regulating data updating performed by the measured data storage processing section so as to ensure the measured data for a first given time period across the occurrence of shock in the memory.

It may be arranged that the storage regulating section regulates the data updating performed by the measured data storage processing section, by setting a second given time period for further data updating by the measured data storage processing section upon the detection of the occurrence of shock by the shock detecting section, so as to ensure the measured data for the first given time period across the occurrence of shock in the memory.

It may be arranged that the sensor section comprises three angular speedometers arranged corresponding to the axes of a three-dimensional space and at least one accelerometer arranged corresponding to at least one of the axes of the three-dimensional space and that the sensor section outputs measured values of the angular speedometers and the at least one accelerometer in time sequence as the measured data.

It may be arranged that the measured data contains data units each assigned time information representing a measurement time and that each data unit contains the measured values of the angular speedometers and the at least one accelerometer measured at the same measurement time.

According to another aspect of the present invention, a vehicle travel analyzer comprises measured data acquiring means for acquiring angular velocity data and acceleration data measured in time sequence relative to axes of a plurality of dimensions at a given position in a vehicle; measured data correcting means for removing a drift component contained in the acquired angular velocity data; and historical data producing means for deriving travel attitude angles of the vehicle from the angular velocity data without the drift component, deriving velocities of the vehicle along the axes of the dimensions from the travel attitude angles and the acquired acceleration data, and producing historical data of the derived travel attitude angles and velocities of the vehicle.

It may be arranged that means is further provided for detecting a time point of an occurrence of shock of the vehicle and a time point of a stop of the vehicle after the occurrence of shock and that the historical data producing means derives the travel attitude angles at the time point of the vehicle stop as initial values and further derives the travel attitude angles and the velocities before the vehicle stop using the initial values.

It may be arranged that means is further provided for processing the travel attitude angles and velocities of the vehicle derived by the historical data producing means so as to visually express a travel history of the vehicle.

It may be arranged that the processing means visually expresses the travel history of the vehicle for a given time period going back from the time point of the vehicle stop.

It may be arranged that the processing means visually expresses the travel history of the vehicle for a given time period toward the time point of the vehicle stop.

It may be arranged that the processing means is an external device.

It may be arranged that the measured data correcting means compares an angular component derived by periodically integrating the acquired angular velocity data and an angular component derived from the acquired acceleration data in a stopped state of the vehicle so as to derive a rate of occurrence of drift contained in the angular velocity data, and that the measured data correcting means removes the drift component from the angular velocity data based on the drift occurrence rate.

It may be arranged that the measured data correcting means accumulates the acquired angular velocity data measured in a stopped state of the vehicle so as to derive a tendency of occurrence of drift contained in the angular velocity data, and that the measured data correcting means removes the drift component from the angular velocity data based on the drift occurrence tendency.

According to another aspect of the present invention, a storage medium is provided with a functional descriptive material which is readable and executable by a computer, and the functional descriptive material allows the computer to execute the steps of acquiring angular velocity data and acceleration data measured in time sequence relative to axes of a plurality of dimensions at a given position in a vehicle; removing a drift component contained in the acquired angular velocity data; and deriving travel attitude angles of the vehicle from the angular velocity data without the drift component and velocities of the vehicle along the axes of the dimensions from the travel attitude angles and the acquired acceleration data so as to produce historical data of the derived travel attitude angles and velocities of the vehicle.

BRIEF DESCRIPTION OF THE DRAWINGS

The present invention will be understood more fully from the detailed description given hereinbelow, taken in conjunction with the accompanying drawings.

In the drawings:

FIG. 4 is a diagram for explaining a structure of data stored in a memory provided in the driving recorder;

FIG. 7B is a flowchart representing a second method of drift correction;

FIGS. 8A and 8B are diagrams for explaining the principle of the first method of drift correction, wherein FIG. 8A shows a drift occurrence state, that is, attitude angles measured by an angular speedometer indicated by a dotted line and attitude angles measured by an accelerometer indicated by a solid line, and FIG. 8B shows drift amounts measured at given time intervals;

DESCRIPTION OF THE PREFERRED EMBODIMENT

Now, a driving recorder system for a vehicle according to a preferred embodiment of the present invention will be described hereinbelow with reference to the accompanying drawings.

The driving recorder system includes a vehicle driving recorder and a vehicle travel analyzer.

Figure 1A:
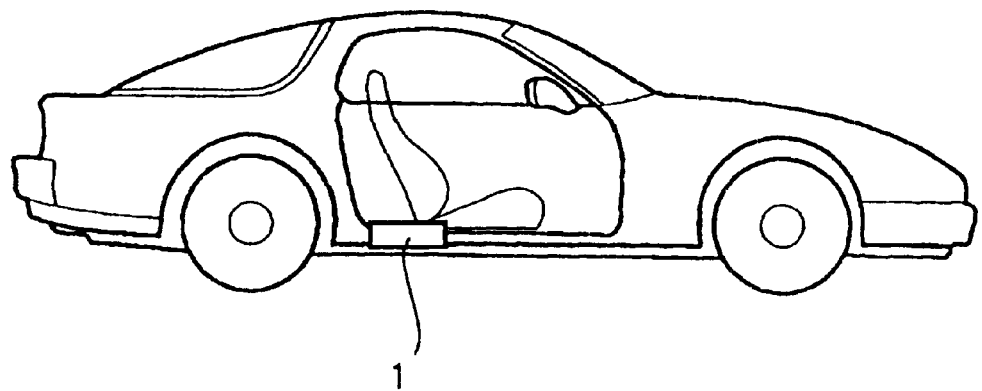
FIG. 1A is a diagram showing a vehicle driving recorder, installed in a vehicle, according to a preferred embodiment of the present invention.
Figure 1B:
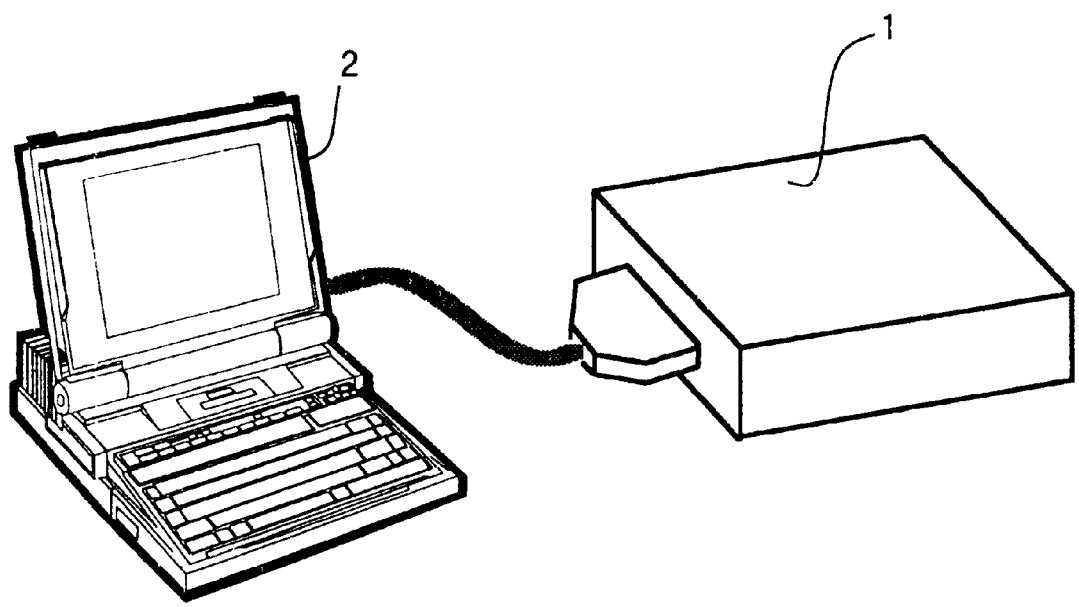
FIG. 1B is a diagram showing the driving recorder and a vehicle travel analyzer according to a preferred embodiment of the present invention, which are connected to each other via communication means to constitute a driving recorder system.

As shown in FIG. 1A, a vehicle driving recorder 1 is detachably installed in a vehicle at a position where a change in attitude or posture of the vehicle can be monitored, for example, at a position under a seat around the center of the vehicle. As shown in FIG. 1B, a vehicle travel analyzer 2 is connected to the driving recorder 1 via communication means, such as the RS-232C, upon analysis.

Hereinbelow, the driving recorder 1 will be first described in detail.

Figure 2:
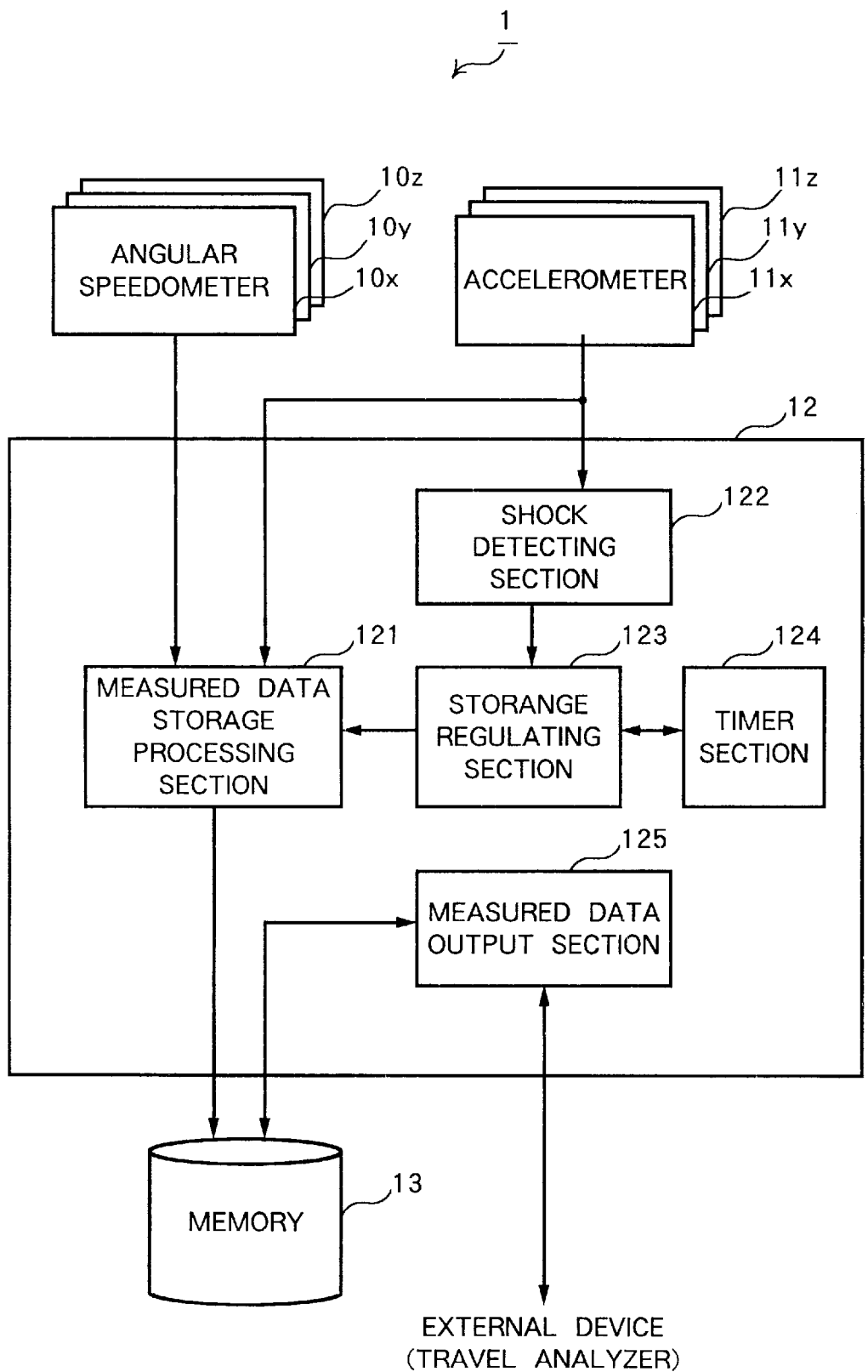
FIG. 2 is a functional block diagram of the driving recorder.

As shown in FIG. 2, the driving recorder 1 includes a sensor section composed of three pairs of angular speedometers $10x$, $10y$, $10z$ and accelerometers $11x$, $11y$, $11z$ arranged along X-, Y- and Z-axes (pitch, roll, yaw), respectively. The driving recorder 1 further includes a nonvolatile memory 13 for storing data measured at the sensor section, and a memory control section 12 for controlling data storage into and data reading from the memory 13. The memory 13 is a backup memory capable of data backup for about three months even if detached from the vehicle or the power is off, and has a storage capacity capable of storing angular velocity data and acceleration data, for about 5 minutes, measured at the sensor section.

The angular speedometers $10x$, $10y$, $10z$ are, for example, in the form of small-size gyroscopes for measuring rotational angular velocities relative to the X-, Y- and Z-axes, respectively. The measured values get to be, for example, text-type angular velocity data (vectors). On the other hand, the accelerometers $11x$, $11y$, $11z$ are, for example, in the form of G (gravitation) sensors each measuring the sum of gravitational acceleration and motion acceleration based on an inclination of the corresponding axis. The measured values get to be, for example, text-type acceleration data (vectors). The angular speedometers $10x$, $10y$, $10z$ are used for measuring turning angles and travel attitude angles of the vehicle, while the accelerometers $11x$, $11y$, $11z$ are used for measuring accelerations/decelerations of the vehicle and lateral accelerations of the vehicle caused by turning. The angular velocity data and the acceleration data are amplified through amplifiers (not shown), respectively, depending on necessity and outputted to the memory control section 12 in time sequence. In case of the gyroscope, a temperature variation may give an influence upon the measured values. Thus, when using it in a cold or hot district, it is preferable to provide correction means for correcting the measured value with a temperature coefficient.

The memory control section 12 is realized by a programmed microprocessor unit (CPU) and functionally includes at least a measured data storage processing section 121, a shock detecting section 122, a storage regulating section 123, a timer section 124 and a measured data output section 125.

The storage processing section 121 stores in sequence the angular velocity data and the acceleration data sent from the sensor section into the memory 13 and thus updates in sequence the data stored in the memory 13. The shock detecting section 122 detects presence or absence of an occurrence of shock. In this preferred embodiment, upon detection of an occurrence of deceleration greater than a preset threshold value by at least one of the accelerometers 11$x$, 11$y$, 11$z$, it is determined that shock due to a crash or the like has occurred. Various other methods may be considered for determining an occurrence of shock or crash.

Upon detection of the occurrence of shock at the shock detecting section 122, the storage regulating section 123 regulates data updating, that is, regulating a time period of data updating, performed by the storage processing section 121 so as to hold the measured data for a given time period across (before and after) the occurrence of shock in the memory 13. The timer section 124 is operated for regulating or setting such a time period of data updating. The measured data output section 125 reads out the measured data stored in the memory 13 and transfers the read-out data to the travel analyzer 2 upon detection of a data collecting request sent from the travel analyzer 2.

Figure 3:
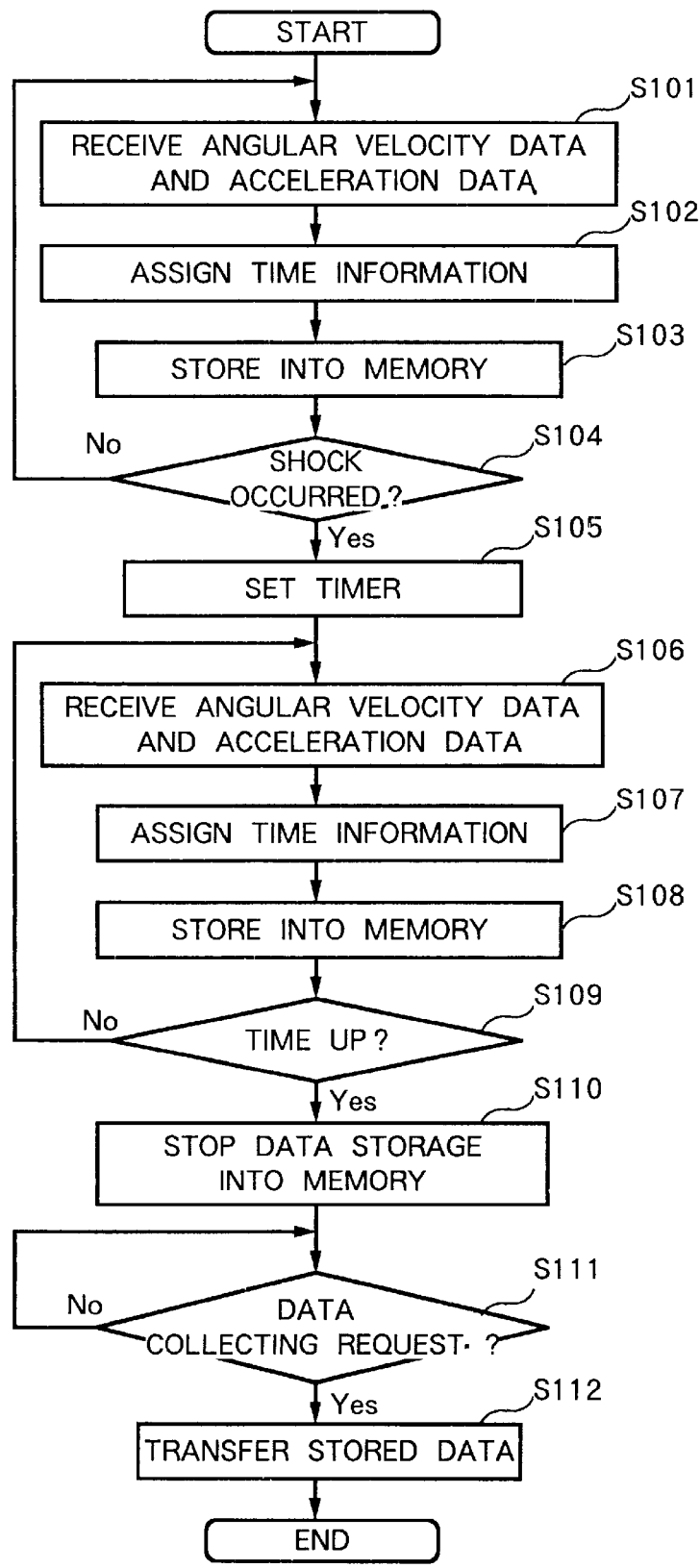
FIG. 3 is a flowchart showing a control routine of a memory control section provided in the driving recorder.

FIG. 3 is a flowchart showing a control routine of the memory control section 12.

In FIG. 3, first at step S101, the memory control section 12 receives the angular velocity data and the acceleration data sent from the sensor section. Then at step S102, time information (time stamp: measured time) is added to the received angular velocity data and acceleration data. Subsequently, at step S103, the data with the time information are sequentially stored into the memory 13. As described before, the memory 13 has the storage capacity for storing the data for about 5 minutes in this preferred embodiment. Thus, when an amount of the data exceeds the storage capacity, the data stored in the memory 13 is erased from the oldest data in sequence so as to update the data in the memory 13. FIG. 4 is a diagram showing a structure of the data stored in the memory 13, wherein data units each including a time stamp Tn (n=1, 2, 3, . . . ), angular velocity data Xjn, Yjn, Zjn and acceleration data Xkn, Ykn, Zkn are arranged in time sequence. The processes at steps S101 to S103 are repeated until the occurrence of shock is detected at step S104.

If the occurrence of shock is detected at step S104, a timer is set at step S105 and then steps S106 to S108 which are the same as the foregoing steps S101 to S103, respectively, are repeated until the set time is up at step S109. The time set at step S105 may be in the range of about 30 seconds to about 2 minutes. If the time is up as monitored at step S109, the routine proceeds to step S110 where data storage into the memory 13 is stopped to stop data updating in the memory 13. Through the foregoing processes, the memory 13 holds at least the angular velocity data and the acceleration data for the set time after detection of the occurrence of shock and for a given time before detection of the occurrence of shock. Then at step S111, the measured data output section 125 monitors whether the data collecting request (command) is received from the travel analyzer 2. Upon detection of the request, the routine proceeds to step S112 where the data stored in the memory 13 are read out and transferred to the travel analyzer 2.

Now, the travel analyzer 2 will be described in detail.

Figure 5:
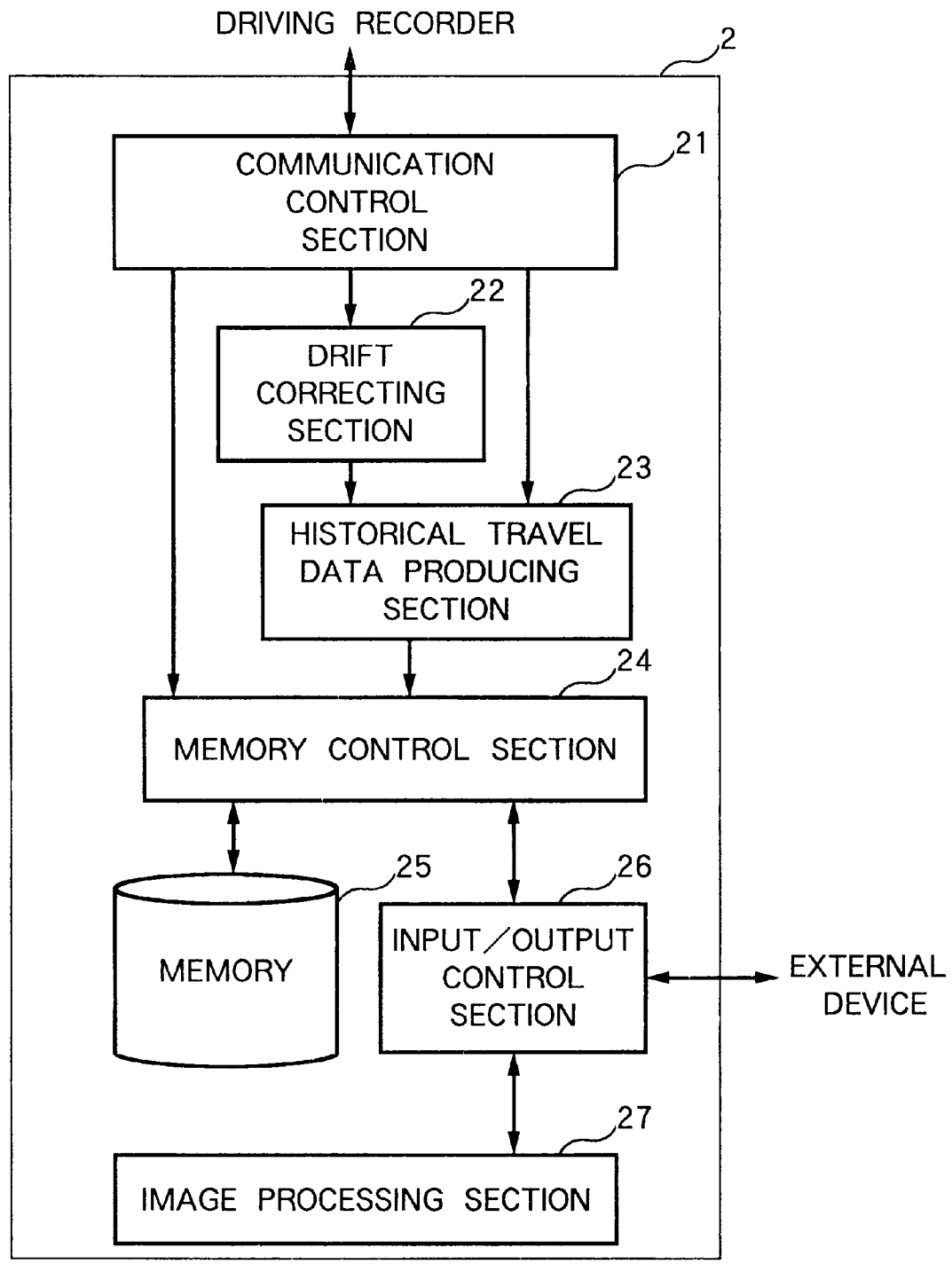
FIG. 5 is a functional block diagram of the travel analyzer.

As shown in FIG. 5, the travel analyzer 2 includes an intelligent communication control section 21 working as measured data acquiring means, a drift correcting section 22 working as measured data correcting means, a historical travel data producing section 23 working as historical travel data producing means, a memory control section 24, a nonvolatile memory 25, an input/output control section 26 and an image processing section 27.

The foregoing sections 21 to 24, 26 and 27 are normally realized through execution, by a CPU of a computer, of given processes according to a functional descriptive material (computer program and necessary data) stored in storing means such as a ROM. The functional descriptive material is not necessarily inseparable from the computer, and thus may be separable from the computer. However, in the latter case, it is necessary to physically substantiate the functional descriptive material on a flexible disk or a CD-ROM in such a manner that the computer can read and execute it.

Hereinbelow, the sections 21 to 24, 26 and 27 will be described in detail.

The communication control section 21 sends the data collecting request to the driving recorder 1 connected to the travel analyzer 2 via the RS-232C or the like, and then classifies or assorts the data received in response to the data collecting request into the angular velocity data and the acceleration data. The drift correcting section 22 receives the angular velocity data from the communication control section 21 and performs drift correction for the received angular velocity data. This function is essential when the gyroscopes are used as the angular speedometers 10$x$, 10$y$, 10$z$ of the driving recorder 1. Details of the drift correction will be described later. The data producing section 23 receives the acceleration data from the communication control section 21 and the angular velocity data after the drift correction from the drift correcting section 22 and produces, based on the received data, historical travel data representing histories of travel attitude angles and velocities of the vehicle for sending to the memory control section 24.

The memory control section 24 receives the historical travel data from the data producing section 23 and the raw data (angular velocity data and acceleration data) from the communication control section 21 and stores the received data into the memory 25. Further, the memory control section 24 reads out and transfers the data stored in the memory 25 based on a data transfer request received from an external device or the image processing section 27 via the input/output control section 26. The image processing section 27 is application executing means and reads out the foregoing historical travel data in sequence from the memory 25 for image processing thereof so as to visually express the travel history of the vehicle.

The reason why the raw data are stored in addition to the historical travel data and transferred in response to the data transfer request, is to cope with data backup or unique travel analysis executed by another application program.

It may be arranged that, instead of the memory 25, the input/output control section 26 and the image processing section 27, an external storage unit, such as a flexible-disk drive or a hard-disk drive, or interface means for an external device is provided so as to allow the memory control section 24 to write the historical travel data produced at the data producing section 23 into an external storage medium or transfer the historical travel data directly to the external device via the interface means.

Now, the operation of the travel analyzer 2 will be described in detail with reference to FIGS. 6 to 9.

Figure 6:
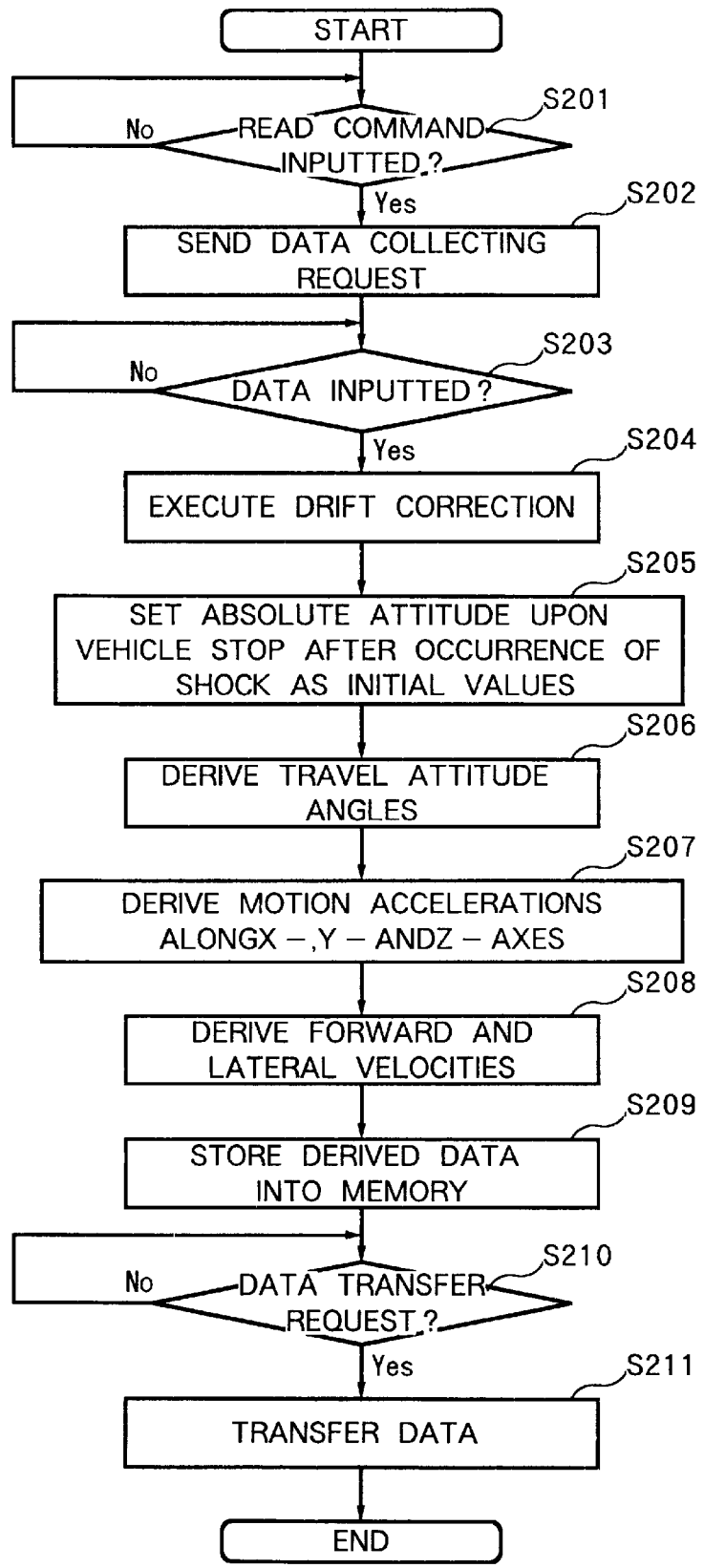
FIG. 6 is a flowchart showing a control routine of the travel analyzer.

FIG. 6 is a flowchart showing a control routine of the travel analyzer 2. In the following description, it is assumed that the driving recorder 1 is connected to the travel analyzer 2 as shown in FIG. 1B.

In FIG. 6, when a read command from an operator of the travel analyzer 2 is inputted at step S201, the routine proceeds to step S202 where the travel analyzer 2 sends out the data collecting request to the driving recorder 1 from the communication control section 21. When the angular velocity data and the acceleration data stored in the memory 13 are all inputted into the communication control section 21 at step S203, the drift correcting section 22 performs the drift correction at step S204. There are two methods available for this drift correction.

Figure 7A:
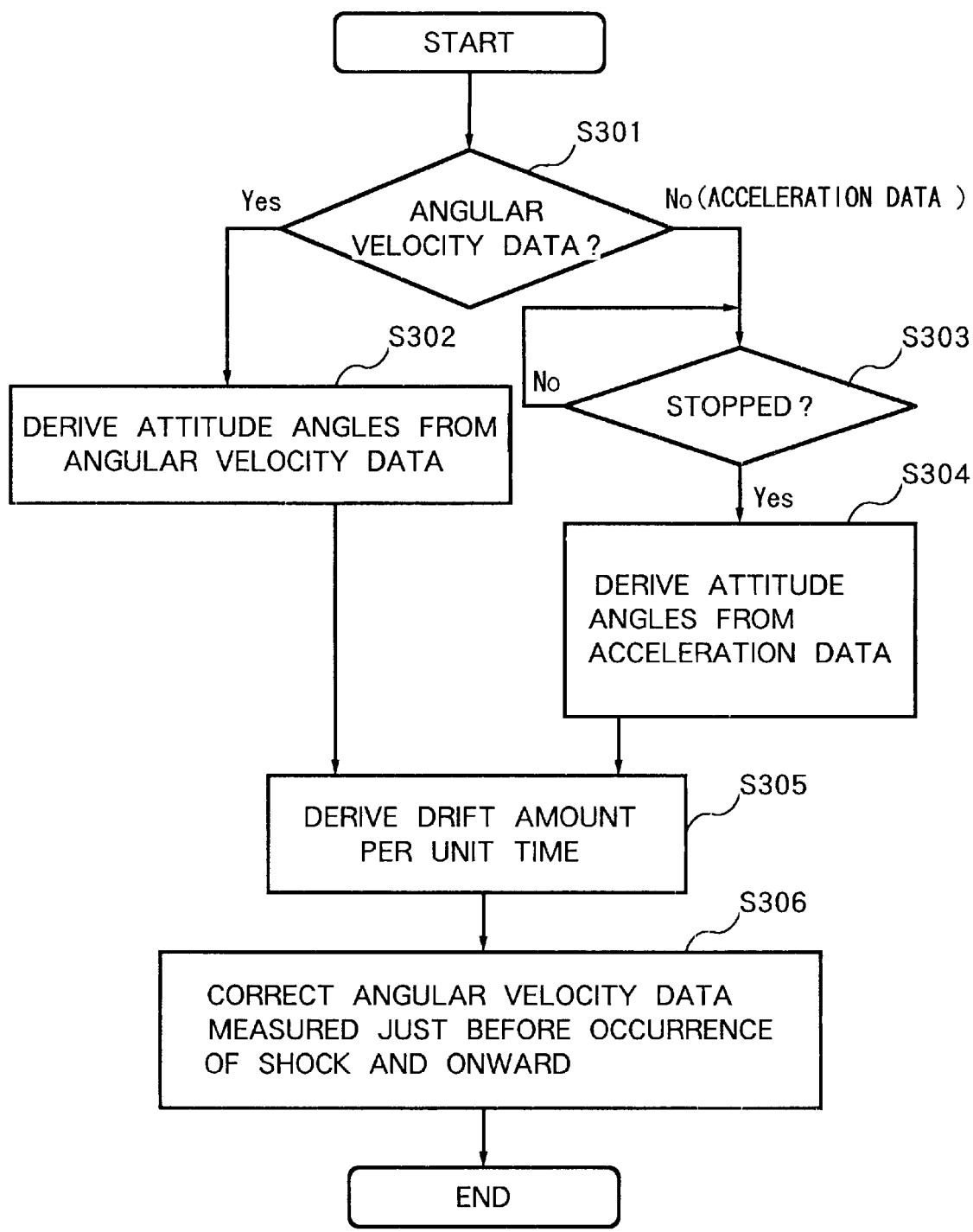
FIG. 7A is a flowchart representing a first method of drift correction.

The first method is as shown in FIG. 7A. Through steps S301 and S302, the angular velocity data are periodically integrated to derive attitude angles. On the other hand, through steps S301, S303 and S304, attitude angles are derived based on the acceleration data in a stopped or static state of the vehicle. Then, at step S305, the attitude angles derived at steps S302 and S304 are compared so as to derive the rate of occurrence of drift components contained in the angular velocity data measured in time sequence (angular data in motion), that is, the drift amount per unit time. Subsequently, at step S306, based on the derived rate of drift component occurrence, the drift components are removed from the angular velocity data measured just before the occurrence of shock and onward to a vehicle stop after the occurrence of shock, for correction of those angular velocity data.

Figures 8A, 8B:
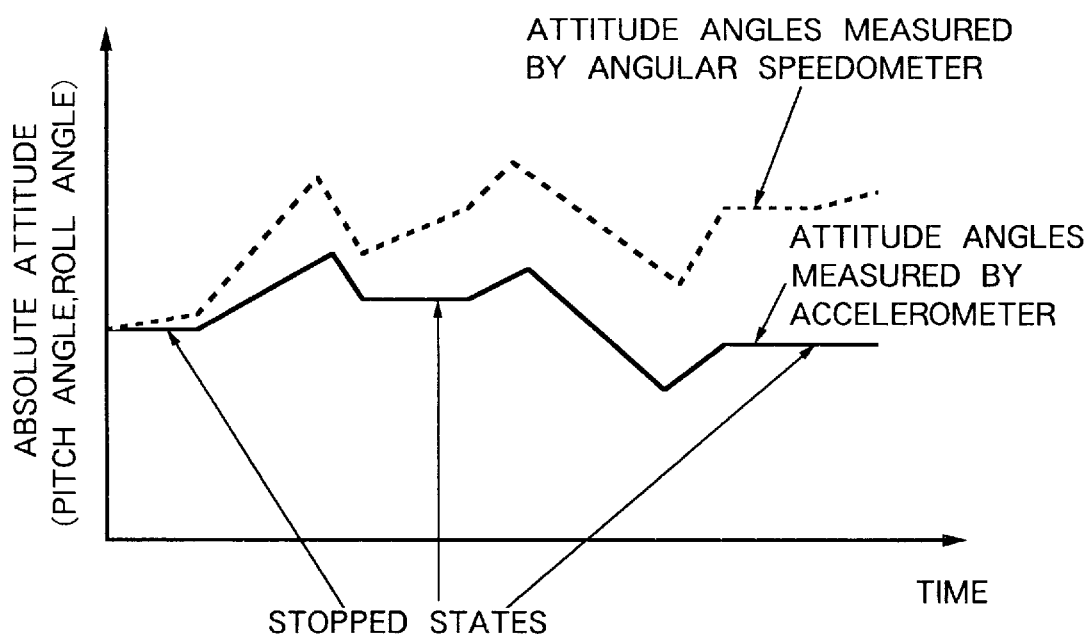

FIGS. 8A and 8B are diagrams for explaining the principle of the foregoing drift correction, wherein FIG. 8A shows the drift occurrence state, that is, the attitude angles measured by the angular speedometer indicated by a dotted line and the attitude angles measured by the accelerometer indicated by a solid line, and FIG. 8B shows the drift amounts measured at given time intervals (per minute in FIG. 8B). Since the accelerometer in the form of the G sensor has no accumulation of the drift, the attitude angle represented by the acceleration data in the static state of the vehicle is accurate. On the other hand, the angular speedometer, particularly the gyroscope, is subjected to accumulation of the drift so that the attitude angle measured by the gyroscope contains a certain error. In view of this, by periodically comparing the attitude angles derived by the acceleration data and the angular velocity data measured at the same timings and deriving differences therebetween, the drift error can be quantified and removed from the angular velocity data. For example, in FIG. 8B, an error due to the drift is generated by 0.2 degrees per minute. Thus, by removing it from the angular velocity data (from the angle derived by the angular velocity data), the highly reliable angular data in motion can be obtained.

The second method is as shown in FIG. 7B, wherein an error caused by the drift can be quantified more easily. First at step S401, the angular velocity data in the stopped state of the vehicle are accumulated. Then at step S402, a tendency of occurrence of the drift components is detected based on the accumulated result. Although it is not questioned whether the collection of the angular velocity data in the vehicle stopped state is performed at regular time intervals or not, it is necessary that the time intervals themselves are known. Ideally, the angular velocity data measured in plural times in the vehicle stopped state coincide with each other. Accordingly, if a deviation is caused as a result of the accumulation at step S401, it means an occurrence of the drift. In view of this, at step S403, based on the drift occurrence tendency derived at step S402, the drift components are removed from the angular velocity data measured just before the occurrence of shock and onward to the vehicle stop after the occurrence of shock, for correction of those angular velocity data.

Although not shown in FIG. 7A or 7B, during execution of step S204 in FIG. 6, a time point of the occurrence of shock is detected in the same manner as in the shock detecting section 122 of the driving recorder 1 and a time point of the vehicle stop after the occurrence of shock is detected by monitoring a variation of the acceleration data.

Referring back to FIG. 6, after execution of step S204, the data producing section 23 produces the historical travel data. Specifically, at step S205, an absolute attitude (travel attitude angles) of the vehicle at the time point of the vehicle stop after the occurrence of shock is derived by integrating the angular velocity data corrected at step S306 or S403 and set as initial values. Subsequently, at step S206, travel attitude angles before the vehicle stop are derived using the corresponding corrected angular velocity data and the initial values set at step S205, that is, for example, by subtracting the corresponding angles from the initial values, respectively. For achieving the angle derivation efficiently and easily, it is preferable to perform Eulerian coordinate transformation of the three-dimensional angular velocity data (vectors) and derive the travel attitude angles on the Euleurial coordinate system.

Thereafter, at step S207, motion accelerations along the X-, Y- and Z-axes are derived based on the travel attitude angles, respectively.

Figure 9:
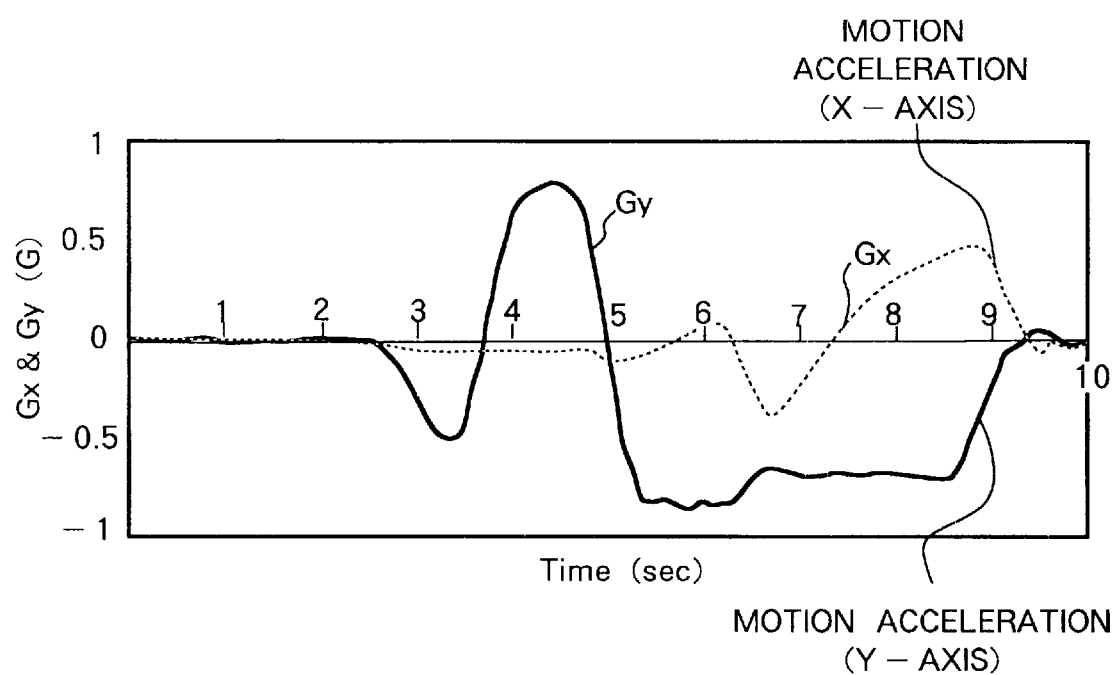
FIG. 9 is a graph showing motion accelerations Gx and Gy along X- and Y-axes, respectively, derived through execution of the flowchart of FIG. 6.

Specifically, the acceleration data g relative to each axis measured during the vehicle traveling is the sum of gravitational acceleration g1 and motion acceleration g2 caused by the inclination of the vehicle. The gravitational acceleration g1 can be derived by an equation g1=G·sinθ, wherein G represents the gravity and θ represents the travel attitude angle relative to each axis. Accordingly, by subtracting the gravitational acceleration g1 from the acceleration data g, the motion acceleration g2 can be derived. Further, by representing the motion acceleration g2 on the Euleurial coordinate system, centripetal accelerations in lateral directions of the vehicle can be derived. The foregoing calculations are performed three-dimensionally, that is, relative to the X-, Y- and Z-axes. On the other hand, in practice, the motion accelerations along the X- and Y-axes (pitch angle, roll angle) are important so that the motion acceleration along the Z-axis (yaw angle) is not necessarily required. FIG. 9 is a graph showing motion accelerations Gx and Gy along the X- and Y-axes, respectively, derived through execution of step S207.

Subsequent to execution of step S207, the routine proceeds to step S208 where forward and lateral velocities are derived by integrating the motion accelerations. The forward velocities mainly represent the travel speeds of the vehicle and a variation thereof represents an accelerator operation and a brake operation. On the other hand, the lateral velocities represent a steering operation, a road condition and a following rolling state during the vehicle running.

Then at step S209, the data produced at the data producing section 23, that is, the data derived at steps S205 to S208, are stored into the memory 25.

The execution of steps S206 to S209 is repeated until all the angular velocity data corrected at step S306 or S403 and the corresponding acceleration data are processed. On the other hand, it may be arranged that the execution of steps S206 to S209 is repeated until all the data inputted into the communication control section 21 are processed. As appreciated, the term "just before the occurrence of shock and onward to a vehicle stop after the occurrence of shock" used at step S306 or S403 represents a time period which requires precise data for analyzing a cause of the accident, that is, a cause of the occurrence of shock, and may be determined also in view of throughput of the computer of the travel analyzer 2 since the drift correction requires much loads on the computer.

Subsequently, through steps S210 and S211, if the data transfer request is received from the image processing section 27 or the external device via the input/output control section 26, the memory control section 24 reads out the data stored in the memory 25 and transfers the read-out data via the input/output control section 26.

Specifically, in case the foregoing historical travel data stored in the memory 25 are analyzed within the travel analyzer 2, the image processing section 27 is activated to send the data transfer request to the memory control section 24 so as to obtain the stored data from the memory 25. Then, the image processing section 27 performs image processing based on the obtained data and, for example, forms a traveling image of the vehicle for a given time period retroactively or going back from the time point of the vehicle stop after the occurrence of shock. It may also be arranged that the traveling image is formed for the given time period toward the time point of the vehicle stop after the occurrence of shock. On the other hand, in case the data stored in the memory 25 are analyzed by the external device, the stored data in the memory 25 are transferred to the external device using a portable memory medium or certain communication means so that the external device performs image processing based on the transferred data.

Figure 10:
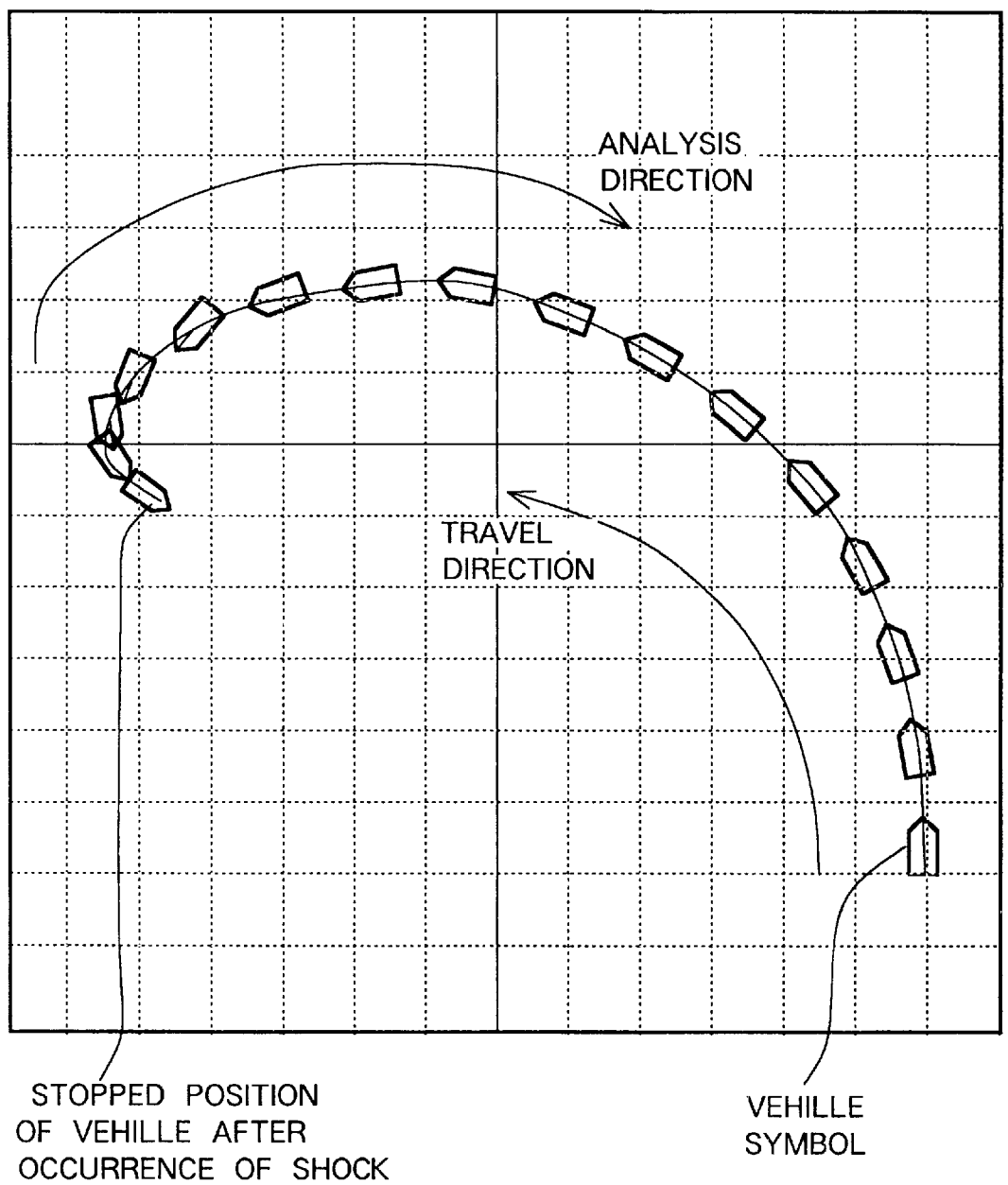
FIG. 10 is a diagram showing one example of the result of image processing according to a preferred embodiment of the present invention.

FIG. 10 is a diagram showing one example of the result of the image processing according to this preferred embodiment. In FIG. 10, the travel history is displayed going back from the time point of the vehicle stop after the occurrence of shock. The forward velocities represent distances between adjacent vehicle symbols and the lateral velocities represent a rolling state of the vehicle around the occurrence of shock. By observing the displayed image, even a person other than an expert of the vehicle travel analysis can objectively judge a traveling state of the vehicle, a cause of the accident and the like.

As described above, in the driving recorder system according to the foregoing preferred embodiment, the angular velocity data and the acceleration data are sequentially stored in the driving recorder 1, and the travel analyzer 2 is connected to the driving recorder 1 upon analyzing the stored data so as to reproduce the travel history of the vehicle. Thus, upon inspection of the accident, an objective judgment or elucidation of a cause of the accident is facilitated. Further, since the traveling state of the vehicle can be quantified, the limitation of a turning angle at a particular speed, that is, the safety operation range of a steering wheel, may be notified to the driver, or an occurrence of a dangerous state is displayed on a screen in advance along with map data in the recently widespread car navigation system. Thus, a proper accident preventive measure, which is scientifically evidenced, can be easily achieved. Further, the driver's consciousness on safety driving can be enhanced since the driver's vehicle operation is constantly monitored.

In the foregoing preferred embodiment, the angular speedometers 10x, 10y, 10z and the accelerometers 11x, 11y, 11z are provided in three pairs. However, the number of them may be changed depending on necessity as long as the data representing the attitude angles and velocities of the vehicle in plural dimensions can be produced in time sequence. Particularly, although it is preferable to set the number of the accelerometers equal to the number of the angular speedometers, the gravitational acceleration and the motion acceleration can be measured if at least one accelerometer is provided. Accordingly, in the foregoing preferred embodiment, at least one accelerometer may be provided other than three.

Further, in the foregoing preferred embodiment, the driving recorder 1 is arranged to store the raw data measured at the sensor section. However, it may be arranged that the driving recorder 1 is provided with functions of the drift correcting section 22 and the data producing section 23 so that the historical travel data are produced in the driving recorder 1 and stored in the memory 13.

As appreciated from the foregoing description, the shock is not limited to that caused by collision or crash. The foregoing historical travel data can be produced in the same manner in response to any possible desired shock. Further, if the historical travel data are stored only for the purpose of reproducing the travel history, it is possible to arrange the system without questioning presence or absence of the shock.

Further, the driving recorder 1 and the travel analyzer 2 are not necessarily provided in pair, but may be separately provided as independent devices.

While the present invention has been described in terms of the preferred embodiments, the invention is not to be limited thereto, but can be embodied in various ways without departing from the principle of the invention as defined in the appended claims.

What is claimed is:

1. A vehicle travel analyzer comprising:

measured data acquiring means for acquiring angular velocity data and acceleration data measured in time sequence relative to axes of a plurality of dimensions at a given position in a vehicle;

measured data correcting means for removing a drift component contained in the acquired angular velocity data; and historical data producing means for deriving travel attitude angles of the vehicle from the angular velocity data without said drift component, deriving velocities of the vehicle along the axes of the dimensions from said travel attitude angles and said acquired acceleration data, and producing historical data of said derived travel attitude angles and velocities of the vehicle;

wherein said measured data correcting means compares an angular component derived by periodically intergrating said acquired angular velocity data and an angular component derived from said acquired acceleration data in a stopped state of the vehicle so as to derive a rate of occurrence of drift contained in said angular velocity data, and wherein said measured data correcting means removes said drift component from said angular velocity data based on said drift occurrence rate.

2. A vehicle driving recorder for measuring the angular velocity data and the acceleration data to be inputted into the vehicle travel analyzer according to claim 1, said vehicle driving recorder comprising:

a sensor section for detecting the angular velocity data and the acceleration data in time sequence relative to the axes of the plurality of dimensions at the given position in the vehicle;

a nonvolatile memory for storing the angular velocity data and the acceleration data for a given time period; and memory control means for sequentially storing sets of the angular velocity data and the acceleration data, each with a corresponding measurement time, into said memory so as to update the angular velocity data and the acceleration data stored in said memory and for, upon detection of a command inputted from said vehicle travel analyzer, reading the angular velocity data and the acceleration data stored in said memory and transferring them to said vehicle travel analyzer.

3. The vehicle travel analyzer according to claim 1, further comprising means for detecting a time point of an occurrence of shock of the vehicle and a time point of a stop of the vehicle after the occurrence of shock, wherein said historical data producing means derives the travel attitude angles at the time point of the vehicle stop as initial values and further derives the travel attitude angles and the velocities before the vehicle stop using said initial values.

4. The vehicle travel analyzer according to claim 3, further comprising means for processing said travel attitude angles and velocities of the vehicle derived by said historical data producing means so as to visually express a travel history of the vehicle.

5. The vehicle travel analyzer according to claim 4, wherein said processing means visually expresses the travel history of the vehicle for a given time period going back from the time point of the vehicle stop.

6. The vehicle travel analyzer according to claim 4, wherein said processing means visually expresses the travel history of the vehicle for a given time period toward the time point of the vehicle stop.

7. The vehicle travel analyzer according to claim 4, wherein said processing means is an external device.

8. A vehicle travel analyzer comprising:
measured data acquiring means for acquiring angular velocity data and acceleration data measured in time sequence relative to axes of a plurality of dimensions at a given position in a vehicle;
measured data correcting means for removing a drift component contained in the acquired angular velocity data; and
historical data producing means for deriving travel attitude angles of the vehicle from the angular velocity data without said drift component, deriving velocities of the vehicle along the axes of the dimensions from said travel attitude angles and said acquired acceleration data, and producing historical data of said derived travel attitude angles and velocities of the vehicle;
wherein said measured data correcting means accumulates said acquired angular velocity data measured in a stopped state of the vehicle so as to derive a tendency of occurrence of drift contained in said angular velocity data, and wherein said measured data correcting means removes said drift component from said angular velocity data based on said drift occurrence tendency.

9. The vehicle travel analyzer according to claim 8, further comprising means for detecting a time point of an occurrence of shock of the vehicle and a time point of a stop of the vehicle after the occurrence of shock, wherein said historical data producing means derives the travel attitude angles at the time point of the vehicle stop as initial values and further derives the travel attitude angles and the velocities before the vehicle stop using said initial values.

10. The vehicle travel analyzer according to claim 9, further comprising means for processing said travel attitude angles and velocities of the vehicle derived by said historical data producing means so as to visually express a travel history of the vehicle.

11. The vehicle travel analyzer according to claim 10, wherein said processing means visually expresses the travel history of the vehicle for a given time period going back from the time point of the vehicle stop.

12. The vehicle travel analyzer according to claim 10, wherein said processing means visually expresses the travel history of the vehicle for a given time period toward the time point of the vehicle stop.

13. The vehicle travel analyzer according to claim 10, wherein said processing means is an external device.

14. A vehicle driving recorder for measuring the angular velocity data and the acceleration data to be inputted into the vehicle travel analyzer according to claim 8, said vehicle driving recorder comprising:
a sensor section for detecting the angular velocity data and the acceleration data in time sequence relative to the axes of the plurality of dimensions at the given position in the vehicle;
a novolatile memory for storing the angular velocity data and the acceleration data for a given time period; and
memory control means for sequentially storing sets of the angular velocity data and the acceleration data, each with a corresponding measurement time, into said memory so as to update the angular velocity data and the acceleration data stored in said memory and for, upon detection of a command inputted from said vehicle travel analyzer, reading the angular velocity data and the acceleration data stored in said memory and transferring them to said vehicle travel analyzer.

15. A vehicle driving recorder comprising:
a sensor section for measuring angular velocity data and acceleration data in time sequence relative to axes of a plurality of dimensions at a given position in a vehicle;
measured data correcting means for comparing an angular component derived by periodically integrating the measured angular velocity data and an angular component derived from the measured acceleration data in a stopped state of the vehicle so as to derive a rate of occurrence of drift contained in the measured angular velocity data, and for removing a drift component from the measured angular velocity data based on said drift occurrence rate;
a nonvolatile memory; and
memory control means for sequentially storing measured data including the angular velocity data free of said drift component and the acceleration data into said memory so as to update the measured data stored in said memory and for, upon detection of a command inputted from an external device, reading the measured data stored in said memory and transferring them to said external device.

16. A computer-readable storage medium storing a functional descriptive material, said functional descriptive material causing a computer to execute the steps of:
acquiring angular velocity data and acceleration data measured in time sequence relative to axes of a plurality of dimensions at a given position in a vehicle;
comparing an angular component derived by periodically integrating the acquired angular velocity data and an angular component derived from the acquired acceleration data in a stopped state of the vehicle so as to derive a rate of occurrence of drift contained in the acquired angular velocity data;
removing a drift component from the acquired angular velocity data based on said drift occurrence rate; and
deriving travel attitude angles of the vehicle from the angular velocity data free of said drift component and velocities of the vehicle along the axes of the plurality of dimensions from said travel attitude angles and said acquired acceleration data so as to produce historical data of said derived travel attitude angles and velocities of the vehicle.

* * * * *